United States Patent
Wang

(10) Patent No.: US 11,487,424 B2
(45) Date of Patent: Nov. 1, 2022

(54) METHOD FOR DISPLAYING CONTENT, TERMINAL, AND STORAGE MEDIUM

(71) Applicant: GUANGDONG OPPO MOBILE TELECOMMUNICATIONS CORP., LTD., Guangdong (CN)

(72) Inventor: Xiao Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/370,796

(22) Filed: Jul. 8, 2021

(65) Prior Publication Data
US 2021/0333990 A1    Oct. 28, 2021

Related U.S. Application Data

(63) Continuation of application No. PCT/CN2020/071760, filed on Jan. 13, 2020.

(30) Foreign Application Priority Data

Jan. 15, 2019 (CN) .......................... 201910037059.0

(51) Int. Cl.
  *G06F 3/04883* (2022.01)
  *G06F 1/16* (2006.01)
  *G06F 3/04842* (2022.01)

(52) U.S. Cl.
  CPC ........ *G06F 3/04883* (2013.01); *G06F 1/1616* (2013.01); *G06F 3/04842* (2013.01)

(58) Field of Classification Search
  CPC . G06F 1/1616; G06F 3/04883; G06F 3/04842
  See application file for complete search history.

(56) References Cited

U.S. PATENT DOCUMENTS

| | | |
|---|---|---|
| 9,170,678 B2 | 10/2015 | Cho et al. |
| 2010/0175018 A1 | 7/2010 | Petschnigg et al. |

(Continued)

FOREIGN PATENT DOCUMENTS

| | | |
|---|---|---|
| CN | 103299262 A | 9/2013 |
| CN | 105808140 A | 7/2016 |

(Continued)

OTHER PUBLICATIONS

Chinese First office action with English Translation of Chinese Application No. 201910037059.0 dated Dec. 28, 2020 (32 pages).

(Continued)

*Primary Examiner* — Andrea C Leggett
(74) *Attorney, Agent, or Firm* — Young Basile Hanlon & MacFarlane, P.C.

(57) ABSTRACT

A method for displaying content is applied to a terminal with a folding screen which includes a first display region and a second display region. The method includes: when the terminal is in an unfolded state, receiving an edge sliding instruction, wherein the edge sliding instruction is an instruction triggered by means of sliding from a trigger edge of the terminal to the inside of the screen, and the unfolded state is used for indicating that the first display region and the second display region are in the same plane; acquiring a content display instruction corresponding to the edge sliding instruction; and displaying, on the screen of the terminal and according to the content display instruction corresponding to the edge sliding instruction, content corresponding to the edge sliding instruction.

20 Claims, 11 Drawing Sheets

(56) References Cited

U.S. PATENT DOCUMENTS

| | | | |
|---|---|---|---|
| 2014/0184526 A1* | 7/2014 | Cho | G06F 3/041 |
| | | | 345/173 |
| 2015/0149936 A1* | 5/2015 | Sirpal | G06F 1/1647 |
| | | | 715/761 |
| 2015/0205560 A1 | 7/2015 | Zhao | |
| 2015/0309691 A1* | 10/2015 | Seo | G06F 3/0484 |
| | | | 345/173 |
| 2015/0363062 A1 | 12/2015 | Gunn | |
| 2018/0374411 A1 | 12/2018 | Yang et al. | |
| 2021/0089202 A1* | 3/2021 | Sim | G09G 3/20 |

FOREIGN PATENT DOCUMENTS

| | | |
|---|---|---|
| CN | 106325749 A | 1/2017 |
| CN | 106775287 A | 5/2017 |
| CN | 107577414 A | 1/2018 |
| CN | 107656683 A | 2/2018 |
| CN | 107704177 A | 2/2018 |
| CN | 107728885 A | 2/2018 |
| CN | 107807760 A | 3/2018 |
| CN | 108008891 A | 5/2018 |
| CN | 108804190 A | 11/2018 |
| CN | 108845756 A | 11/2018 |
| EP | 2720127 A2 | 4/2014 |
| EP | 3312713 A1 | 4/2018 |
| WO | 2012097385 A2 | 7/2012 |
| WO | 2014200735 A1 | 12/2014 |

OTHER PUBLICATIONS

International search report with English Translation of International Application No. PCT/CN2020/071760 dated Apr. 17, 2020 (14 pages).

Rejection decision with English Translation of Chinese Application No. 201910037059.0 dated Jun. 3, 2021 (34 pages).

Extended European search report for EP Application No. 20741485.5 dated Jan. 7, 2022 (7 pages).

Notification to Grant Patent Right for Invention with English Translation for Chinese Application No. 201910037059.0 dated Jan. 13, 2022 (8 pages).

* cited by examiner

METHOD FOR DISPLAYING CONTENT, TERMINAL, AND STORAGE MEDIUM

CROSS-REFERENCE TO RELATED APPLICATION(S)

The present application is a continuation-application of International (PCT) Patent Application No. PCT/CN2020/071760 filed on Jan. 13, 2020, which claims priority of Chinese Patent Application No. 201910037059.0, filed on Jan. 15, 2019, the entire contents of both of which are hereby incorporated by reference.

TECHNICAL FIELD

The present application relates to the technical field of computers, and in particular, to a method for displaying content, a terminal, and a storage medium.

BACKGROUND

With technical improvements of mobile terminal, users more and more desire interacting with mobile terminals using screens with big sizes.

In related arts, when a user uses a mobile terminal with a large-sized screen to perform a navigation operation, it is required that one hand holds the mobile terminal and the other hand clicks a navigation button.

SUMMARY

According to content of one aspect of the present application, a method for displaying content is provided. The method is applicable to a terminal with a foldable screen, and the screen of the terminal comprises a first display region and a second display region. The method comprises: when the terminal is in an unfolded state, receiving an edge sliding instruction, wherein the edge sliding instruction is an instruction triggered by sliding from a trigger edge of the terminal to inside of the screen, and the unfolded state is configured for indicating that the first display region and the second display region are located in the same plane; acquiring a content display instruction corresponding to the edge sliding instruction; and displaying content corresponding to the edge sliding instruction on the screen of the terminal according to the content display instruction corresponding to the edge sliding instruction.

According to content of another aspect of the present application, a terminal is provided. The terminal comprises a processor and a memory, the memory stores at least one instruction, the instruction is loaded and executed by the processor to implement the method for displaying content provided by the above embodiment of the present application.

According to content of another aspect of the present application, a non-transitory computer-readable storage medium is provided. The non-transitory computer-readable storage medium stores at least one instruction, the instruction is loaded and executed by a processor to implement the method for displaying content provided by the above embodiment of the present application.

BRIEF DESCRIPTION OF DRAWINGS

In order to describe technical solutions in embodiments of the present application more clearly, drawings required being used in description of the embodiments will be simply introduced below. Obviously, the drawings in the following description are merely some embodiments of the present application. For one of ordinary skill in the art, it is also possible to obtain other drawings according to these drawings without paying any creative work.

DETAILED DESCRIPTION

Figure 1:
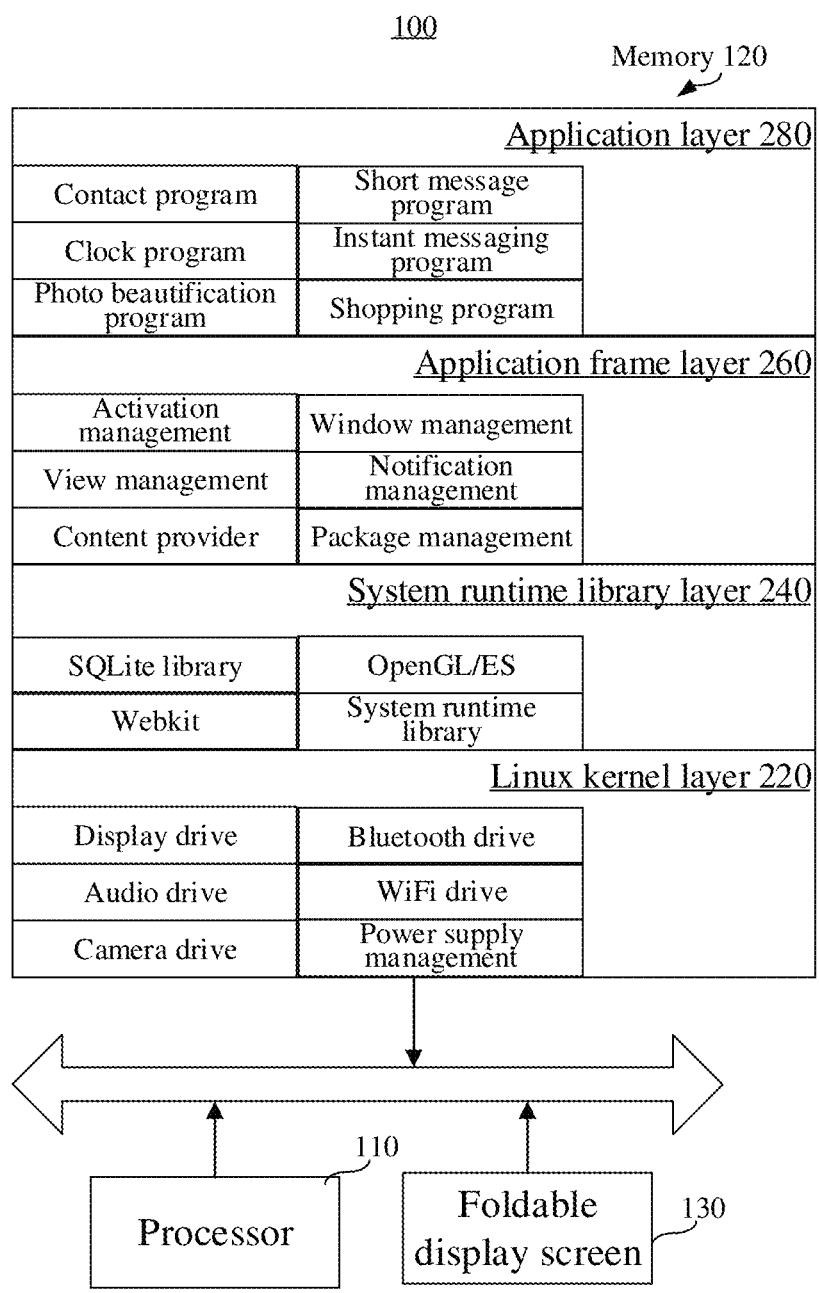
FIG. 1 is a structural block diagram of a terminal 100 provided by an exemplary embodiment of the present application.

In order to make purposes, technical solutions, and advantages of the present application be clearer, embodiments of the present application will be further described in detail below in accompany with the drawings.

When the following description refers to the accompanying drawings, unless otherwise indicated, identical numbers in different drawings represent the same or similar elements. The implementations described in the following exemplary embodiments do not represent all implementations being consistent with the present application. On the contrary, they are merely examples of devices and methods being consistent with some aspects of the present application as detailed in the appended claims.

In the description of the present application, it should be understood that the terms "first", "second", and the like are only used for descriptive purposes, and cannot be understood as indicating or implying relative importance. In the description of the present application, it should be noted that, unless otherwise clearly specified and limited, the terms "interconnect" and "connect" should be understood in a broad sense. For example, they can be fixedly connected, and can also be detachably connected, or integrally connected; they can be mechanically connected, and can also be electrically connected; they can be directly connected, and can also be indirectly connected through an intermediate medium. For those of ordinary skill in the art, specific meaning of the above-mentioned terms in the present application can be understood under specific circumstances. In addition, in the description of the present application, unless otherwise specified, "plurality" means two or more. "And/or" describes an association relationship of associated objects, and indicates that there can be three types of relationships, for example, A and/or B can indicate three situations: A exists alone, A and B exist at the same time, and B exists alone. The character "/" generally indicates that the associated objects before and after it are in an "or" relationship.

In order to facilitate understanding the solutions shown in the embodiments of the present application, several terms appearing in the embodiments of the present application are introduced below.

Edge sliding instruction: an instruction triggered by sliding from a trigger edge of a terminal with a foldable screen to inside of a screen. The present application is applied in a terminal with a foldable screen, a foldable display screen of the terminal with a foldable screen (which can also be called "screen" for short) is provided therein with a touch sensor, which can receive touch control instructions. When the terminal with a foldable screen is operated by sliding from the trigger edge to the inside of the screen using a finger or other objects having touch control capability, the terminal can be triggered to send an edge sliding instruction. Optionally, the edge sliding instruction is sent from a terminal with a foldable screen.

Content display instruction: which is configured to instruct the terminal with a foldable screen to display content corresponding to the edge sliding instruction on the screen. There is a correspondence relationship between an edge sliding instruction that can be recognized by the terminal and the content display instruction. The terminal can search out the content display instruction under action of the edge sliding instruction according to the correspondence relationship.

Edge staying time length: which is configured to indicate a time length in which the edge sliding instruction is acting on a specified edge of the screen. For example, the edge sliding instruction is acting on a side edge of a first display region of the terminal with a foldable screen, and thus the edge staying time length is configured to indicate a time length of pressing on the side edge by a finger of a user.

An embodiment of the present application can be applied in a terminal with a foldable screen, wherein a screen of the terminal with a foldable screen comprises a first display region and a second display region. A method comprises: when the terminal with a foldable screen is in an unfolded state, receiving an edge sliding instruction, wherein the edge sliding instruction is an instruction triggered by sliding from a trigger edge of the terminal with a foldable screen to inside of the screen, and the unfolded state is configured for indicating that the first display region and the second display region are located in the same plane; acquiring a content display instruction corresponding to the edge sliding instruction; and displaying content corresponding to the edge sliding instruction on the screen of the terminal with a foldable screen according to the content display instruction corresponding to the edge sliding instruction.

Optionally, the acquiring a content display instruction corresponding to the edge sliding instruction comprises: acquiring a trigger parameter of the edge sliding instruction, wherein the trigger parameter comprises at least one of a trigger edge, a sliding speed, an edge staying time length, and a sliding distance; and acquiring a corresponding content display instruction according to the trigger parameter.

Optionally, the trigger parameter comprises the trigger edge and the sliding speed, and the acquiring a corresponding content display instruction according to the trigger parameter comprises: when the trigger edge is parallel to a folding axis of the terminal with a foldable screen, and the sliding speed is not less than a speed threshold, determining that an instruction of returning to a previous level is a content display instruction corresponding to the edge sliding instruction; wherein the instruction of returning to a previous level is configured for instructing the terminal with a foldable screen to display content of a previous level.

Optionally, the trigger parameter comprises the trigger edge and the sliding distance, and the acquiring a corresponding content display instruction according to the trigger parameter comprises: when the trigger edge is parallel to a folding axis of the terminal with a foldable screen, and the sliding distance belongs to a first distance range, determining that an instruction of displaying the latest task is a content display instruction corresponding to the edge sliding instruction; wherein the instruction of displaying the latest task is configured for instructing the terminal with a foldable screen to display at least one latest task.

Optionally, the displaying content corresponding to the edge sliding instruction on the screen of the terminal with a foldable screen according to the content display instruction corresponding to the edge sliding instruction comprises: displaying at least one latest task close to the trigger edge triggered by the edge sliding instruction according to the instruction of displaying the latest task.

Optionally, the acquiring a corresponding content display instruction according to the trigger parameter comprises: when the trigger edge is parallel to a folding axis of the terminal with a foldable screen, and the sliding distance belongs to a second distance range, determining that an instruction of displaying an application icon is a content display instruction corresponding to the edge sliding instruction; wherein a left endpoint of the second distance range is not less than a right endpoint of the first distance range, and the instruction of displaying an application icon is configured for instructing the terminal with a foldable screen to display a start icon of at least one application.

Optionally, when an instruction of displaying an application icon is a content display instruction corresponding to the edge sliding instruction, the displaying content corresponding to the edge sliding instruction on the screen of the terminal with a foldable screen comprises: displaying a start icon of at least one application in a first sub-region, wherein the first sub-region is a region between a second sub-region and the trigger edge triggered by the edge sliding instruction, and the second sub-region is a region displaying the at least one latest task; wherein the first sub-region and the second sub-region belong to the first display region; or the first sub-region and the second sub-region belong to the second display region.

Optionally, the method further comprises: when receiving an instruction of clicking the start icon, displaying a user interface that is displayed by the terminal with a foldable screen before screen division on the first display region, and displaying an application corresponding to the start icon on the second display region; wherein the first display region is a display region comprising a target edge, and the target edge is an edge triggered by the edge sliding instruction.

Optionally, the trigger parameter comprises the edge staying time length, the when the trigger edge is parallel to a folding axis of the terminal with a foldable screen, and the sliding distance belongs to a first distance range, determining that an instruction of displaying the latest task is a content display instruction corresponding to the edge sliding instruction comprises: when the trigger edge is parallel to a folding axis of the terminal with a foldable screen, the edge staying time length configured for indicating keeping the trigger edge is not less than a time length threshold, and the sliding distance belongs to the first edge range, determining that an instruction of displaying the latest task is a content display instruction corresponding to the edge sliding instruction.

Optionally, the method further comprises: when the trigger edge is parallel to a folding axis of the terminal with a foldable screen, and the edge staying time length configured for indicating keeping the trigger edge is not less than a time length threshold, displaying a triggered object close to the trigger edge, wherein the triggered object is configured for indicating that the terminal with a foldable screen is in a task display state; wherein the terminal with a foldable screen in the task display state determines that an instruction of displaying the latest task is a content display instruction corresponding to the edge sliding instruction when the sliding distance belongs to a first distance range.

Figure 2:
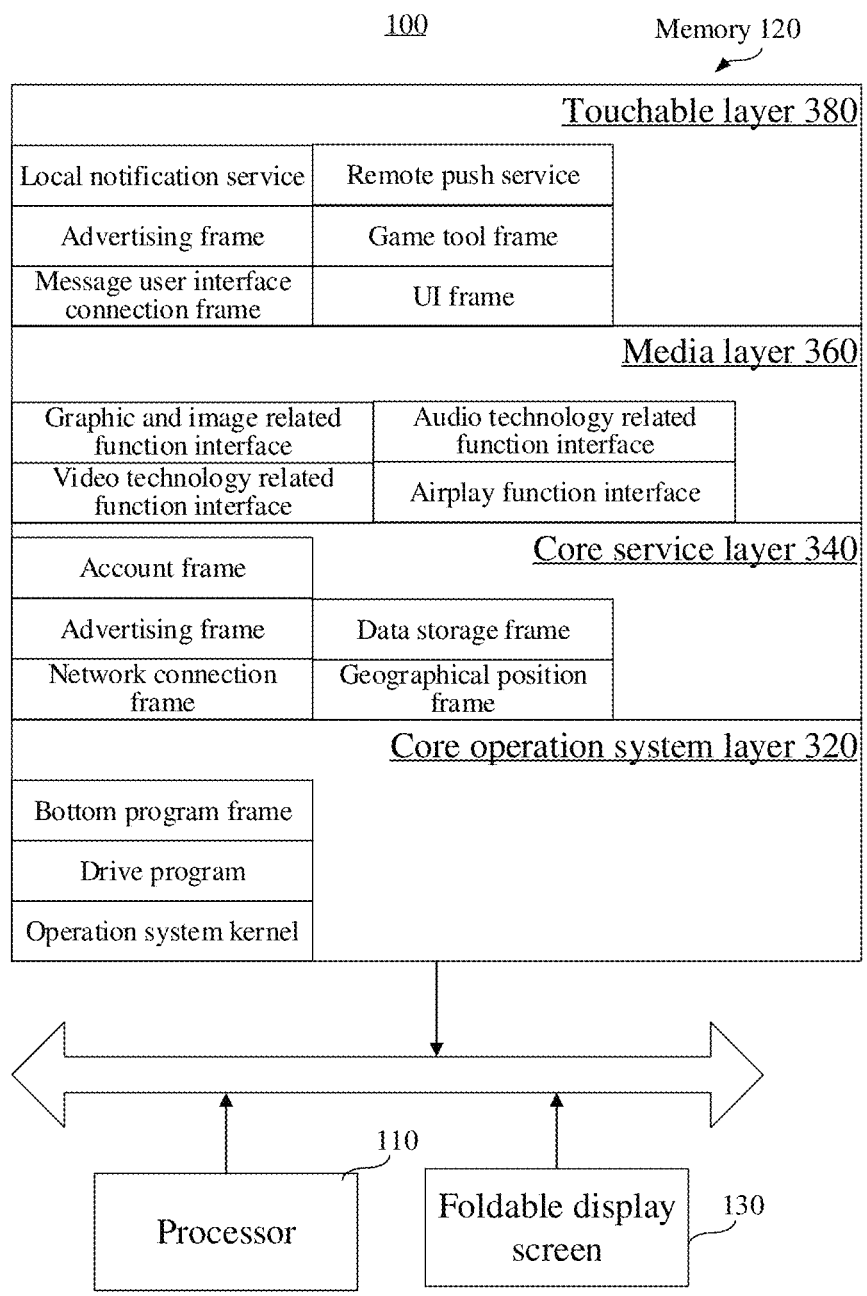
FIG. 2 is another structural block diagram of a terminal 100 provided by an exemplary embodiment of the present application.

Referring to FIG. 1 and FIG. 2, structural block diagrams of a terminal 100 provided by an exemplary embodiment of the present application are shown. The terminal 100 can be a smart phone, a tablet computer, an electronic book, and so on. The terminal 100 in the present application can comprise one or more of the following components: a processor 110, a memory 120, and a foldable display screen 130.

The processor 110 may include one or more processing core. The processor 110 uses various interfaces and lines to connect various parts of the entire terminal 100, and executes various functions of the terminal 100 and processes data by running or executing instructions, programs, code sets, or instruction sets stored in the memory 120 and calling data stored in the memory 120. Optionally, the processor 110 may adopt at least one hardware form of digital signal processing (DSP), field-programmable gate array (FPGA), and programmable logic array (PLA) to be implemented. The processor 110 may be integrated with one or a combination of a central processing unit ( ) a graphics processing unit (GPU), and a modem. Among them, the CPU mainly processes operation systems, user interfaces, and applications; the GPU is used for rendering and drawing content that needs to be displayed on the touch display screen 130; and the modem is used for processing wireless communication. It can be understood that the above-mentioned modem may also not be integrated into the processor 110, but be implemented by a single chip.

The memory 120 may include a random access memory (RAM), and may also include read-only memory ROM). Optionally, the storage 120 includes a non-transitory computer-readable storage medium. The memory 120 may be used to store instructions, programs, codes, code sets or instruction sets. The memory 120 may include a program storage area and a data storage area, wherein the program storage area may store instructions for implementing an operation system, instructions for at least one function (such as a touch control function, a sound playback function, an image playback function, etc.), instructions for implementing the following various method embodiments, etc.; the data storage area may store data created according to use of the terminal 100 (such as audio data and a phone book) and the like.

Taking the operation system as an Android system as an example, the programs and data stored in the memory 120 are as shown in FIG. 1. The memory 120 stores a Linux kernel layer 220, a system runtime library layer 240, an application framework layer 260, and an application layer 280. The Linux kernel layer 220 provides low-level drivers for various hardware of the terminal 100, such as display drivers, audio drivers, camera drivers, Bluetooth drivers, Wi-Fi drivers, power management, and so on. The system runtime library layer 240 provides major feature support for the Android system through some C/C++ libraries. For example, SQLite library provides database support, OpenGL/ES library provides 3D drawing support, Webkit library provides browser kernel support, and so on. The system runtime library layer 240 further provides an Android runtime library (Android Runtime), which mainly provides some core libraries, which can allow developers to use the Java language to write Android applications. The application framework layer 260 provides various APIs that may be used when building applications. Developers can also use these APIs to build their own applications, such as activity management, window management, view management, notification management, content providers, package management, call management, resource management, location management. There is at least one application running in the application layer 280. These applications can be contact programs, SMS programs, clock programs, camera applications, etc., which come with the operation system; they can also be applications developed by third-party developers, such as instant Communication program, photo beautification program, etc.

Taking the operation system as an IOS system as an example, the programs and data stored in the memory 120 are as shown in FIG. 2. The IOS system includes: a core operation system layer 320 (Core OS Layer), a core services layer 340 (Core Services Layer), a media layer 360 (Media Layer), and a touchable layer 380 (Cocoa Touch Layer). The core operation system layer 320 includes an operation system kernel, driver programs, and underlying program frameworks. These underlying program frameworks provide functions closer to hardware for use by program frameworks located in the core service layer 340. The core service layer 340 provides system services and/or program frameworks required by applications, such as a foundation framework, an account framework, an advertising framework, a data storage framework, a network connection framework, a geographic location framework, a sports framework, and so on. The media layer 360 provides interfaces relating to visual and aural aspects for applications, such as graphics and image-related interfaces, audio technology-related interfaces, video technology-related interfaces, and wireless playback (AirPlay) interfaces for audio and video transmission technology, etc. The touchable layer 380 provides various commonly used interface-related frameworks for application development, and the touchable layer 380 is responsible for touch interaction operations of users on the terminal 100. Such as local notification services, remote push services, advertising frameworks, game tool frameworks, message user interface (UI) frameworks, user interface UIKit frameworks, map frameworks, and so on.

In the framework shown in FIG. 2, frameworks related to most applications include but are not limited to: the basic framework in the core service layer 340 and the UIKit framework in the touchable layer 380. The basic framework provides many basic object classes and data types, provides the most basic system services for all applications, and has nothing to do with UIs. The classes provided by the UIKit framework are the basic UI class libraries used to create touch-based user interfaces. An IOS application can provide a UI based on the UIKit framework, so it provides a basic architecture of an application for building user interfaces, drawing, processing events of interactions with users, responding to gestures, etc.

The foldable display screen 130 is a screen having a folding function, which is configured to display user interfaces of various applications; when the foldable display screen 130 further has a touch control function, it is further configured to receive touch operations on it or near it by users using any appropriate objects such as fingers, touch styluses.

Optionally, the foldable display screen 130 includes a first display region 131 and a second display region 132. In an unfolded state, as shown in FIG. 3, the first display region 131 and the second display region 132 are located in the same plane; in a folded state, as shown in FIG. 4, the first display region 131 and the second display region 132 are located in different planes.

It needs to be noted that the first display region 131 and the second display region 132 are only used to distinguish different display regions on the foldable display screen 130, and they essentially belong to the same foldable display screen 130.

In order to realize folding of a display screen, in a possible implementation, the foldable display screen 130 is made of flexible material (with certain retractility and ductility), or a connection region between the first display region 131 and the second display region 132 is made of flexible material.

Figure 3:
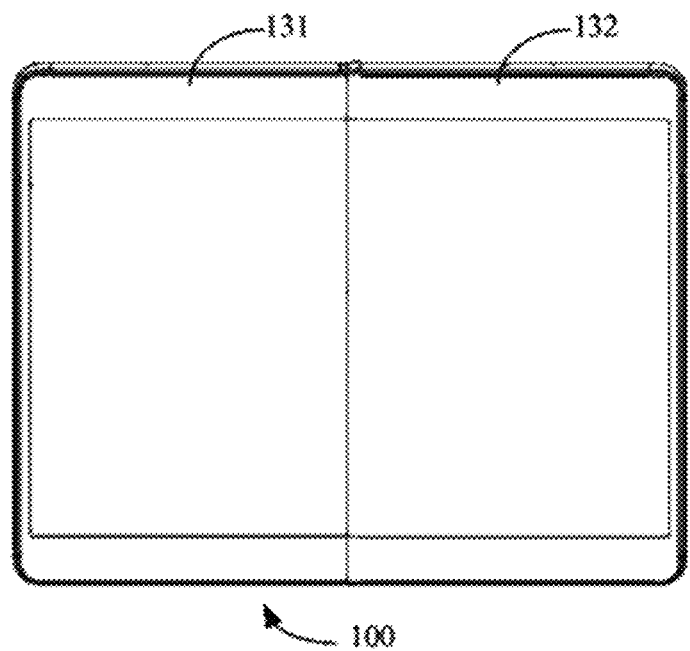
FIG. 3 is a schematic view of an unfolded state of a terminal 100 provided by an exemplary embodiment of the present application.
Figure 4:
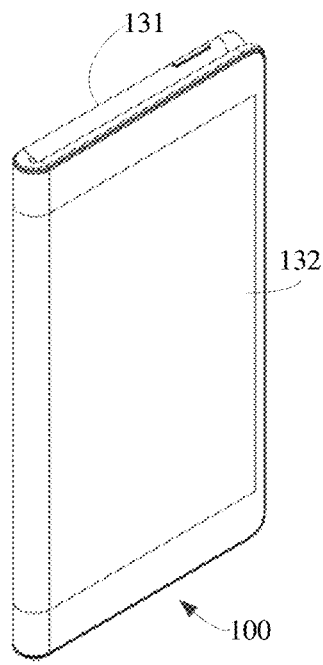
FIG. 4 is a schematic view of a folded state of a terminal 100 provided by an exemplary embodiment of the present application.

Both FIG. 3 and FIG. 4 take a terminal 100 that is a terminal with an outwardly foldable screen (i.e., a terminal of which a foldable display screen is exposed outside in a folded state) as an example to describe. In other possible implementations, the terminal 100 can also be a terminal with an inwardly foldable screen (i.e., a terminal of which a foldable display screen is not exposed in a folded state). In order to facilitate description, the following embodiments take a terminal 100 that is a terminal with an outwardly foldable screen to describe, but do not form any limitation thereto.

In FIG. 3 and FIG. 4, only a foldable display screen 130 including two display regions is taken as an example to be described. In other possible implementations, the foldable display screen 130 can includes n (n≥3) display regions, thereby realizing a terminal with an n-1-folded structure, these embodiments do not limit thereto.

Optionally, the terminal 100 is further provided therein with at least one kind of other component, the at least one kind of other component includes a camera, a fingerprint sensor, a proximity light sensor, a distance sensor, etc. In some embodiments, the at least one kind of other component is provided on a front side, a side edge, or a back side of the terminal 100, for example, a fingerprint sensor is provided on a back cover or a side edge, and a camera is provided at a side of the foldable display screen 130.

In other embodiments, the at least one kind of other component can be integrated in an inside or a bottom layer of the foldable display screen 130. In some embodiments, a bone-conduction type receiver is provided in the terminal 100; other embodiments on a front panel of a traditional terminal are integrated in all areas or some areas of the foldable display screen 130, for example, after dividing a light sensing component in a camera into a plurality of light sensing pixels, each light sensing pixel is integrated in a black region of each display pixel of the foldable display screen 130, such that the foldable display screen 130 has an image capturing function. Since the at least one kind of other component is integrated in an inside or a bottom layer of the foldable display screen 130, the terminal 100 has a higher screen-to-body ratio.

In some optional embodiments, a single side edge, or two side edges (e.g., left and right side edges), or four side edges (e.g., top, bottom, left, and right side edges) of a middle frame of the terminal 100 is/are provided with an edge touch sensor, the edge touch sensor is configured to detect at least one kind of operation in touch operations, clicking operations, pressing operations, sliding operations, and the like of users on the middle frame. The edge touch sensor can be any kind of a touch sensor, a thermal sensor, a pressure sensor, and the like. A user can apply an operation on the edge touch sensor to control applications in the terminal 100.

In addition, those skilled in the art can understand that the structure of the terminal 100 shown in the drawings do not form any limitation to the terminal 100. The terminal can include more or less components than shown in the drawings, or combination of some components, or different arrangements of components. For example, the terminal 100 can further include components such as a radio frequency circuit, an input unit, an audio circuit, a Wireless Fidelity (WiFi) module, a power assembly, a Bluetooth module, etc., which are not repeated here.

Figure 5:
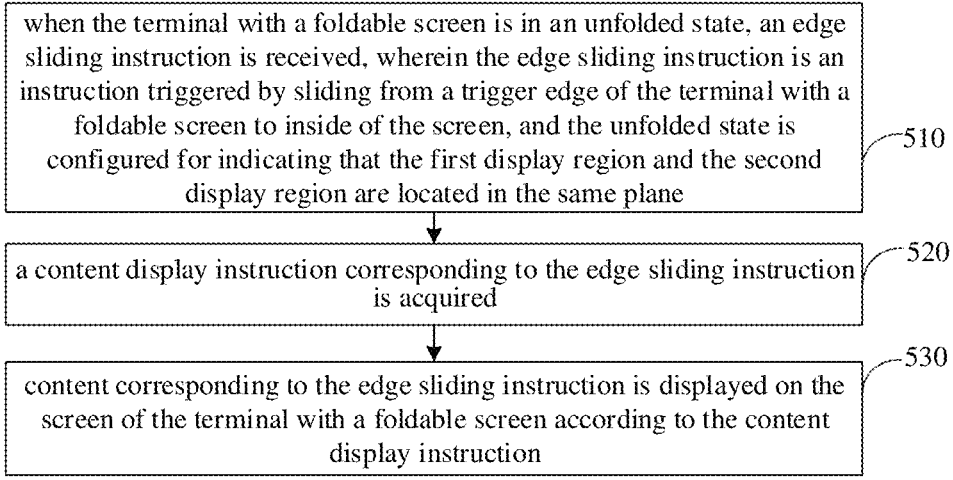
FIG. 5 is a flow chart of a method for displaying content provided by an exemplary embodiment of the present application.

Referring to FIG. 5, which is a flow chart of a method for displaying content provided by an exemplary embodiment of the present application. The method for displaying content can be applied in the terminal with a foldable screen shown above. For example, in some embodiments, a terminal, such as the aforementioned terminal 100, comprises a processor and a memory, such as the aforementioned processor 110 and memory 120; the memory stores at least one instruction, and the instruction can be loaded and executed by the processor to implement any of the methods for displaying content as detailed in the following method embodiments. In FIG. 5, the method for displaying content includes the follows.

Operation 510, when the terminal with a foldable screen is in an unfolded state, an edge sliding instruction is received, wherein the edge sliding instruction is an instruction triggered by sliding from a trigger edge of the terminal with a foldable screen to inside of the screen, and the unfolded state is configured for indicating that the first display region and the second display region are located in the same plane.

In embodiments of the present application, the terminal with a foldable screen can have two using states. When the first display region and the second display region of the terminal with a foldable screen are located in the same plate, the terminal with a foldable screen is in an unfolded state. When the first display region and the second display region of the terminal with a foldable screen are not located in the same plate, the terminal with a foldable screen is in a folded state.

In a possible manner, the terminal with a foldable screen can determine whether itself is in the unfolded state or the folded state by detecting sensor parameters set in the terminal.

In another possible manner, the terminal with a foldable screen can further determine its own state by accessing a data identification in an operation system. In this manner, when the terminal with a foldable screen transforms from the folded state into the unfolded state, or the terminal with a foldable screen transforms from the unfolded state into the folded state, a sensor can report a corresponding event to the operation system, the operation system will change a data identification for the folding state according to the corresponding event, such that the operation system can determine its own folding state according to the data identification and avoids from accessing the sensor at every time of determining its own state.

In the present application, when the terminal with a folding screen determines that itself is in the unfolded state, the terminal with a folding screen will receive an edge sliding instruction.

In a possible manner, when the terminal with a folding screen is used by a user or a tester, the edge sliding instruction can be an instruction triggered by a finger sliding from a trigger edge of the terminal with a foldable screen to inside of the screen.

In another possible manner, when the terminal with a foldable screen is used by a touch control stylus or a robot arm, the edge sliding instruction can be an instruction triggered by a touch control object, such as a touch stylus or the like, sliding from a trigger edge of the terminal with a foldable screen to inside of the screen.

Operation 520, a content display instruction corresponding to the edge sliding instruction is acquired.

In the present application, the terminal with a foldable screen can store a correspondence relationship between the edge sliding instruction and a content display instruction. In this scene, the terminal with a foldable screen can acquire a content display instruction corresponding to the edge sliding instruction. In a possible manner, the correspondence relationship can be a table correspondence form, a function mapping relationship, or an event association relationship, this embodiment does not limit here.

Operation 530, content corresponding to the edge sliding instruction is displayed on the screen of the terminal with a foldable screen according to the content display instruction.

In embodiments of the present application, the terminal with a foldable screen can determine content corresponding to the edge sliding instruction therein.

Optionally, different content display instructions in the terminal with a foldable screen will display corresponding content. For example, if the present application is applied to displaying corresponding content for navigation operations, the content display instruction can correspond to a corresponding navigation instruction, and the terminal with a foldable screen will display content corresponding to the edge sliding instruction according to different navigation instructions.

In conclusion, this embodiment provides a method for displaying content, this solution is applied in a terminal with a foldable screen, the terminal with a foldable screen includes a first display region and a second display region; when the terminal with a foldable screen is in an unfolded state, an edge sliding instruction is received, wherein the edge sliding instruction is an instruction triggered by sliding from a trigger edge of the terminal with a foldable screen to inside of the screen, and the unfolded state is configured for indicating that the first display region and the second display region are located in the same plane; a content display instruction corresponding to the edge sliding instruction is required; and content corresponding to the edge sliding instruction is displayed on the screen of the terminal with a foldable screen according to the content display instruction corresponding to the edge sliding instruction. It can be seen that the present application can enable the terminal with a folding screen in the unfolded state to display corresponding content under the action of only one edge sliding instruction, which reduces the difficulty of executing a navigation operation using a large-sized terminal, and improves the operability of the terminal with a folding screen in the unfolded state.

Based on the solution disclosed by the previous embodiment, a terminal with a foldable screen can further determine a corresponding content display instruction according a trigger parameter of an edge sliding instruction. Please refer to the following embodiment.

Figure 6:
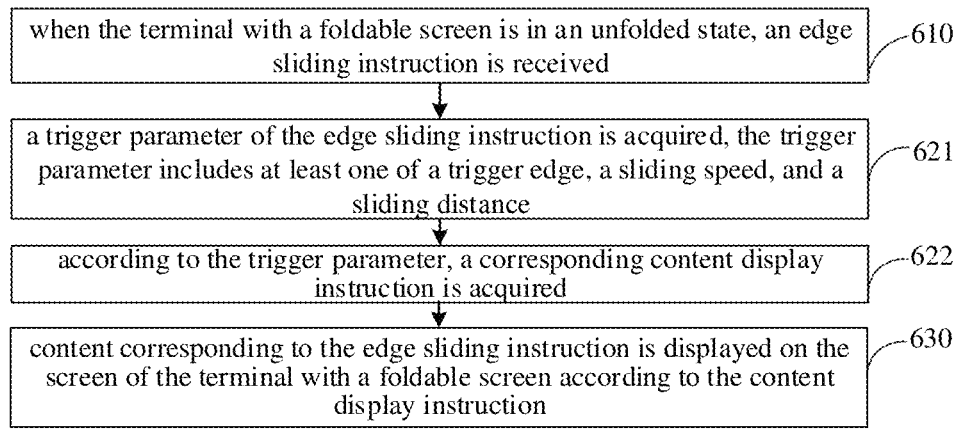
FIG. 6 is a flow chart of a method for displaying content provided by another exemplary embodiment of the present application.

Referring to FIG. 6, which is a flow chart of a method for displaying content provided by another exemplary embodiment of the present application. The method for displaying content can be applied in a terminal shown in any of FIG. 1 to FIG. 4 shown above. In FIG. 6, the method for displaying content includes the follows.

Operation 610, when the terminal with a foldable screen is in an unfolded state, an edge sliding instruction is received.

In embodiments of the present application, the execution process of the operation 610 is the same as the execution process of the operation 510, and is not repeated here.

Operation 621, a trigger parameter of the edge sliding instruction is acquired, the trigger parameter includes at least one of a trigger edge, a sliding speed, and a sliding distance.

In this embodiment, the terminal with a foldable screen can acquire a trigger parameter of the edge sliding instruction, the trigger parameter includes at least one of a trigger edge, a sliding speed, and a sliding distance.

In a possible manner, the trigger parameter may include only one kind of parameter.

Optionally, the trigger parameter can be a trigger edge, the trigger edge is configured to indicate an edge identification triggered by the edge sliding instruction. If the terminal with a foldable screen is rectangular or of a shape being similar to rectangular, the trigger edge can be one kind of a top edge, a bottom edge, a left edge, and a right edge.

Optionally, the trigger parameter can also be a sliding speed. The terminal with a foldable screen can recognize different sliding speeds. For example, the terminal with a foldable screen can recognize speeds in a first speed range, a second speed range, and a third speed range, wherein each speed range corresponds to a content display instruction.

Optionally, the trigger parameter can also be a sliding distance. The terminal with a foldable screen can recognize different sliding distances. For example, the terminal with a foldable screen can recognize speeds in a first speed distance, a second speed distance, and a third speed distance, wherein each speed distance corresponds to a content display instruction.

In another possible manner, the trigger parameter may include two kinds of parameters. Optionally, the trigger parameter may include a trigger edge and a sliding speed. Optionally, the trigger parameter may include a trigger edge and a sliding distance. Optionally, the trigger parameter may include a sliding distance and a sliding speed.

In another possible manner, the trigger parameter may include three kinds of parameters. For example, the trigger parameter includes a trigger edge, a sliding speed, and a sliding distance.

Operation 622, according to the trigger parameter, a corresponding content display instruction is acquired.

In embodiments of the present application, the terminal with a foldable screen can acquire a corresponding content display instruction according to a trigger parameter. In this process, the terminal with a foldable screen will acquire a corresponding content display instruction according to a case of the trigger parameter.

In a possible manner, when the trigger parameter includes only one kind of parameter, there may exist the following correspondence relationship between the trigger parameter and the content display instruction in the terminal with a foldable screen.

(1) When the trigger parameter is a trigger edge, the terminal with a fold screen can select three trigger edges as target edges. Referring to Table 1, which shows a possible correspondence relationship between a trigger edge and a content display instruction.

TABLE 1

| Trigger edge | Left edge | Right edge | Bottom edge |
| --- | --- | --- | --- |
| Content display instruction | Application icon display instruction | Latest task display instruction | Previous level returning instruction |

In the Table 1, when the trigger edge of the edge sliding instruction is a left edge, a corresponding content display instruction is an application icon display instruction. When the trigger edge of the edge sliding instruction is a right edge, a corresponding content display instruction is a latest task display instruction. When the trigger edge of the edge sliding instruction is a bottom edge, a corresponding content display instruction is a previous level returning instruction.

It needs to be noted that in a possible manner, the left edge of the terminal with a foldable screen is parallel to the right edge, and parallel to a folding axis of the terminal with a foldable screen. The folding axis of the terminal with a foldable screen is perpendicular to the bottom edge.

In another possible manner, the left edge of the terminal with a foldable screen is parallel to the right edge, and perpendicular to a folding axis of the terminal with a foldable screen. The folding axis of the terminal with a foldable screen is parallel to the bottom edge.

It needs to be noted that the terminal with a foldable screen can set apart the upper edge to facilitate popping up of an informing bar and other controls.

(2) When the trigger parameter is a sliding distance, the terminal with a foldable screen can preset three sliding distance ranges, for example, a first distance range, a second distance range, and a third distance range. Referring to Table 2, which shows a possible correspondence relationship between a sliding distance and a content display instruction.

TABLE 2

| Sliding distance range | First distance range | Second distance range | Third distance range |
| --- | --- | --- | --- |
| Content display instruction | Latest task display instruction | Application icon display instruction | Previous level returning instruction |

It needs to be noted that in a possible manner, the first distance range, the second distance range, and the third distance range are ranges that do not overlap with each other. The three distance ranges can have different orders. For example, the first distance range, the second distance range, and the third distance range can be arranged from left to right on a number axis. Alternatively, the first distance range, the third distance range, and the second distance range can be arranged from left to right on a number axis. Alterna-tively, the second distance range, the third distance range, and the first distance range can be arranged from left to right on a number axis. Alternatively, the second distance range, the first distance range, and the third distance range can be arranged from left to right on a number axis. Alternatively, the third distance range, the first distance range, and the second distance range can be arranged from left to right on a number axis. Alternatively, the third distance range, the second distance range, and the first distance range can be arranged from left to right on a number axis.

In a possible manner, the terminal with a foldable screen can set an anti-mistouch distance range, a right endpoint of the anti-mistouch distance range is less than a left endpoint of any target distance range. The target distance range can be a range of the first distance range, the second distance range, and the third distance range. Since the present application is provided with the anti-mistouch distance range, an edge of the terminal with a foldable screen, when detecting an edge sliding instruction with a small sliding distance, can not execute a corresponding operation, so as to avoid a mis-operation caused by a finger approaching a trigger edge when a user holding the terminal with a foldable screen.

(3) When the trigger parameter is a sliding speed, the terminal with a foldable screen can preset three sliding speed ranges, for example, a first speed range, a second speed range, and a third speed range. Referring to Table 3, which shows a possible correspondence relationship between a sliding speed and a content display instruction.

TABLE 3

| Sliding speed range | First speed range | Second speed range | Third Speed range |
| --- | --- | --- | --- |
| Content display instruction | Latest task display instruction | Application icon display instruction | Previous level returning instruction |

It needs to be noted that in a possible manner, the sliding speed can be an average sliding speed when a single edge sliding instruction is completed. For example, a single edge sliding instruction corresponding to one sliding operation, and the whole process of the sliding operation corresponds to an average sliding speed.

In another possible manner, the sliding speed can also be an instantaneous sliding speed. For example, the terminal with a foldable screen acquires an instantaneous sliding speed at the time of 0.2 second after a sliding operation corresponding to an edge sliding instruction starts.

It needs to be noted that in a possible manner, the first speed range, the second speed range, and the speed distance range are ranges that do not overlap with each other. The three speed ranges can have different orders. For example, the first speed range, the second speed range, and the third speed range can be arranged from left to right on a number axis. Alternatively, the first speed range, the speed distance range, and the second speed range can be arranged from left to right on a number axis. Alternatively, the second speed range, the third speed range, and the first speed range can be arranged from left to right on a number axis. Alternatively, the second speed range, the first speed range, and the third speed range can be arranged from left to right on a number axis. Alternatively, the third speed range, the first speed range, and the second speed range can be arranged from left to right on a number axis. Alternatively, the third speed range, the second speed range, and the first speed range can be arranged from left to right on a number axis.

In a possible manner, the terminal with a foldable screen can set an anti-mistouch speed range, a right endpoint of the anti-mistouch speed range is less than a left endpoint of any target speed range. The target speed range can be a range of the first speed range, the second speed range, and the third speed range. Since the present application is provided with the anti-mistouch speed range, an edge of the terminal with a foldable screen, when detecting an edge sliding instruction with a small sliding speed, can not execute a corresponding operation, so as to avoid a mis-operation caused by a finger approaching a trigger edge when a user holding the terminal with a foldable screen. For example, when the terminal with a foldable screen detects a sliding operation instruction with a very low sliding speed, the terminal with a foldable screen can recognize the sliding operation instruction as a mis-operation instruction and do not execute a corresponding operation, for example, do not execute a corresponding navigation operation.

Operation 630, content corresponding to the edge sliding instruction is displayed on the screen of the terminal with a foldable screen according to the content display instruction.

In embodiments of the present application, the execution process of the operation 630 is the same as the execution process of the operation 530, and is not repeated here.

In conclusion, a method for displaying content displayed by embodiments of the present application can receive an edge sliding instruction when a terminal with a foldable screen is in an unfolded state, acquire a trigger parameter of the edge sliding instruction, acquire a corresponding content display instruction according to the trigger parameter, and display content corresponding to the edge sliding instruction on the screen of the terminal with a foldable screen according to the content display instruction. Since the terminal with a foldable screen can acquire the trigger parameter of the edge sliding instruction in the unfolded state, and the trigger parameter includes at least one kind of a trigger edge, a sliding speed, and a sliding distance, the terminal with a foldable screen thus can determine a corresponding content display instruction relatively accurately, and finally display corresponding content, such that a capability of using the terminal with a foldable screen to display content corresponding to an edge touch instruction accurately is improved.

Based on the solution disclosed by the previous embodiment, a terminal with a foldable screen can further determine to return to a previous level of instruction when a trigger parameter includes a trigger edge and a sliding speed, such that the terminal with a foldable screen can quickly return a previous level of user interface and display a previous level of content in an unfolded state based on an edge touch instruction. As an exemplary illustration, please refer to the following embodiments.

Figure 7:
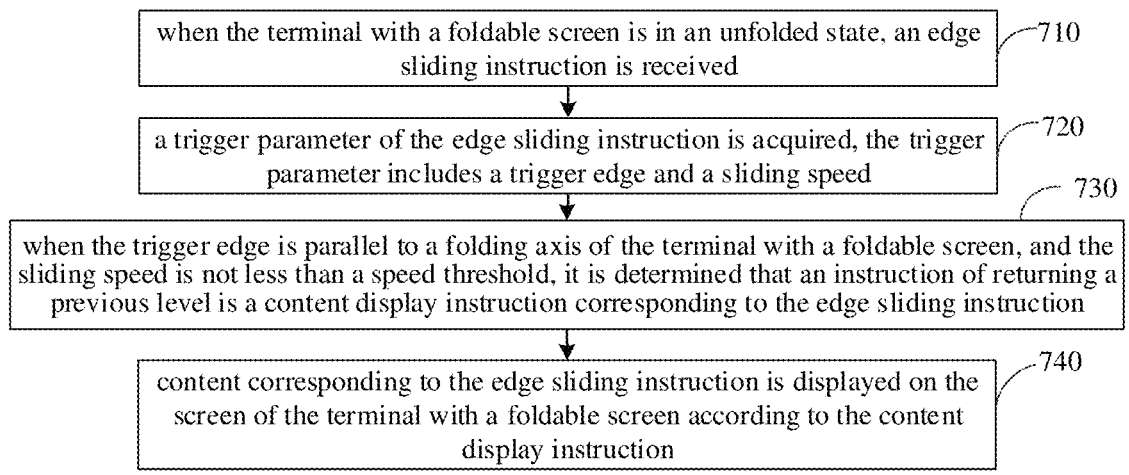
FIG. 7 is a flow chart of a method for displaying content provided by another exemplary embodiment of the present application.

Referring to FIG. 7, which is a flow chart of a method for displaying content provided by another exemplary embodiment of the present application. The method for displaying content can be applied in a terminal shown in any one of above FIG. 1 to FIG. 4. In FIG. 7, the method for displaying content includes the follows.

Operation 710, when the terminal with a foldable screen is in an unfolded state, an edge sliding instruction is received.

In embodiments of the present application, the execution process of the operation 710 is the same as the execution process of the operation 510, and is not repeated here.

Operation 720, a trigger parameter of the edge sliding instruction is acquired, the trigger parameter includes a trigger edge and a sliding speed.

In embodiments of the present application, the execution process of the operation 720 is the same as the execution process of the operation 621, and is not repeated here.

Operation 730, when the trigger edge is parallel to a folding axis of the terminal with a foldable screen, and the sliding speed is not less than a speed threshold, it is determined that an instruction of returning a previous level is a content display instruction corresponding to the edge sliding instruction.

In this embodiment, the instruction of returning a previous level is configured to instruct the terminal with a foldable screen to display content of a previous level.

In embodiments of the present application, a terminal with a foldable screen can determine that an instruction of returning a previous level is a content display instruction corresponding to the edge sliding instruction when the trigger edge is parallel to a folding axis of the terminal with a foldable screen and the sliding speed is not less than a speed threshold. Wherein, the speed threshold can be a preset constant value, and embodiments of the present application do not limit this. From this, it can be seen that the terminal with a foldable screen can return to a previous level of user interface when an edge receives quick sliding.

Figure 8:
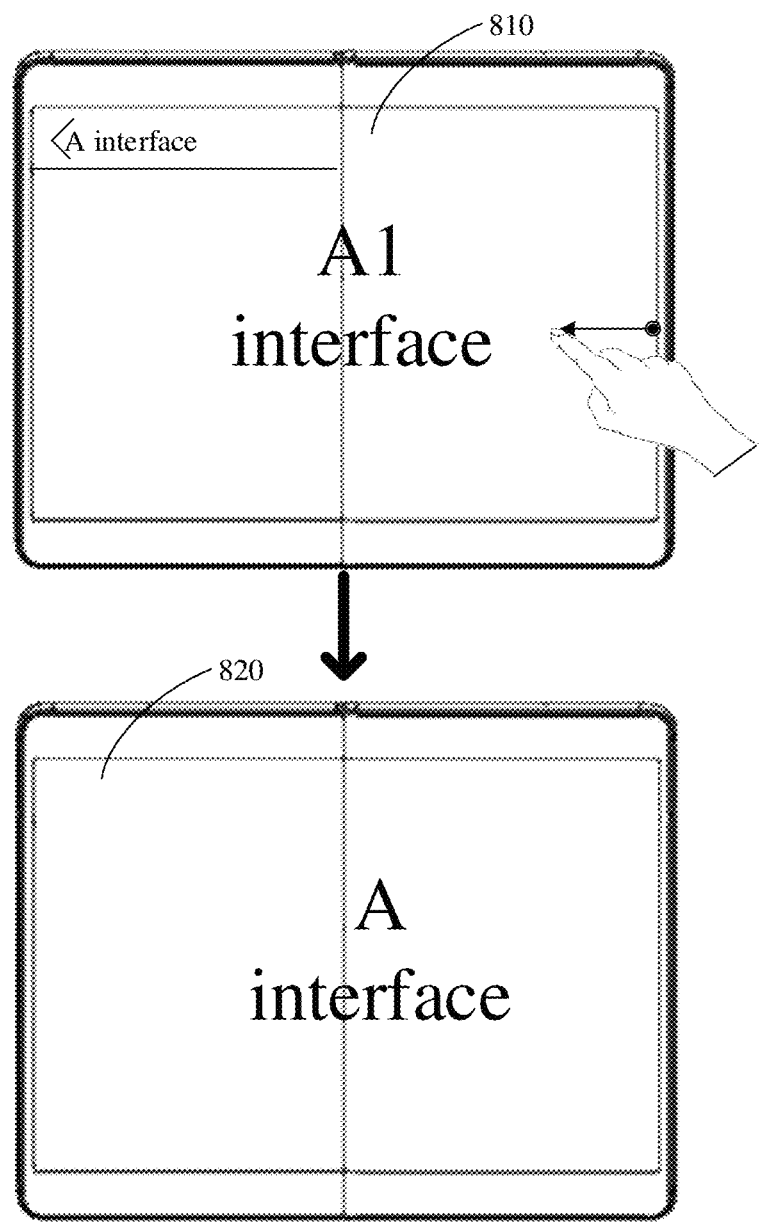
FIG. 8 is a schematic view of returning to a previous level of content based on a terminal with a foldable screen being in an unfolded state shown in FIG. 7.

Referring to FIG. 8, which is a schematic view of returning to a previous level of content based on a terminal with a foldable screen being in an unfolded state shown in FIG. 7. In a user interface 810, the terminal receives an edge sliding instruction; based on sliding parameters of the edge sliding instruction, when determining parameters that a trigger edge is parallel to a folding axis of the terminal with a foldable screen and a sliding speed is not less than a speed threshold, the terminal with a foldable screen displays the user interface 810 as a user interface 820. Wherein, the user interface 810 is a next level of interface of the user interface 820, that is, the user interface 820 is a previous level of interface of the user interface 810.

Operation 740, content corresponding to the edge sliding instruction is displayed on the screen of the terminal with a foldable screen according to the content display instruction.

In embodiments of the present application, the execution process of the operation 740 is the same as the execution process of the operation 530, and is not repeated here.

In conclusion, a method for displaying content disclosed by embodiments of the present application can receive an edge sliding instruction and acquire a trigger edge and a sliding speed of the edge sliding instruction when the terminal with a foldable screen is in an unfolded state; when the trigger edge is parallel to a folding axis of the terminal with a foldable screen, and the sliding speed is not less than a speed threshold, it is determined that an instruction of returning a previous level is a content display instruction corresponding to the edge sliding instruction; according to the content display instruction, content corresponding to the edge sliding instruction is displayed on the screen of the terminal with a foldable screen. Since the terminal with a foldable screen can complete returning a previous level and displaying content of the previous level by a simple edge gesture operation in an unfolded state, operability of returning a previous level of operation of the terminal with a foldable screen in the unfolded state is improved.

Based on the methods shown in the above embodiments, embodiments of the present application further provides a method for displaying content, which can determine a latest task display instruction or an application icon display instruction when a trigger parameter includes a trigger edge and a sliding distance. As an exemplary illustration, please refer to the following embodiments.

Figure 9:
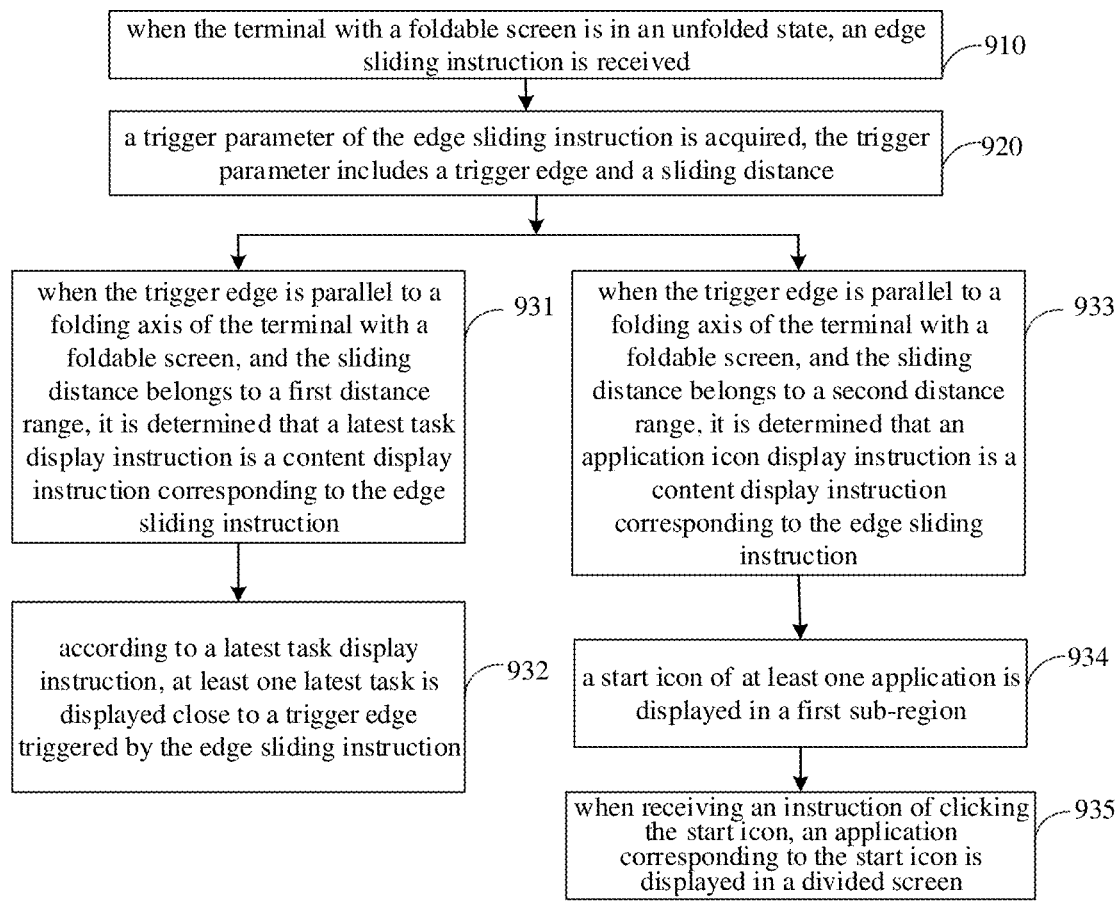
FIG. 9 is a flow chart of another method for displaying content provided by another exemplary embodiment of the present application.

Referring to FIG. 9, which is a flow chart of another method for displaying content provided by another exemplary embodiment of the present application. The method for displaying content can be applied in a terminal shown in any one of above FIG. 1 to FIG. 4. In FIG. 9, the method for displaying content includes the follows.

Operation 910, when the terminal with a foldable screen is in an unfolded state, an edge sliding instruction is received.

In embodiments of the present application, the execution process of the operation 910 is the same as the execution process of the operation 510, and is not repeated here.

Operation 920, a trigger parameter of the edge sliding instruction is acquired, the trigger parameter includes a trigger edge and a sliding distance.

In embodiments of the present application, the execution process of the operation 920 is the same as the execution process of the operation 621, and is not repeated here.

In embodiments of the present application, the terminal with a foldable screen, after completing execution of the operation 920, can select to execute an operation 931 and an operation 932, and can also select to execute an operation 933, an operation 934, and an operation 935.

Operation 931, when the trigger edge is parallel to a folding axis of the terminal with a foldable screen, and the sliding distance belongs to a first distance range, it is determined that a latest task display instruction is a content display instruction corresponding to the edge sliding instruction.

In this embodiment, the latest task display instruction is configured to instruct the terminal with a foldable screen to display at least one latest task.

In embodiments of the present application, when the trigger edge is parallel to a folding axis of the terminal with a foldable screen and the sliding distance belongs to a first distance range, the terminal with a foldable screen can determine a latest task display instruction is a content display instruction corresponding to the edge sliding instruction. From this, it can be seen that the terminal with a foldable screen provided by the present application can determine the latest task display instruction quickly.

In a possible scene, the first distance range can be a distance range starting from 0, such as (0, 100 pixels), (0, 200 pixels), etc. In another possible scene, the first distance range can also be a distance range not starting from 0, such as (50 pixels, 100 pixels), (50 pixels, 200 pixels), etc. In such a scene, a distance range (0, 50pixels) can serve as an anti-mistouch distance range; when detecting that a sliding distance corresponding to the edge sliding instruction belongs to this distance range, the terminal will not search a corresponding latest task display instruction or other instructions for the edge sliding instruction.

Operation 932, according to a latest task display instruction, at least one latest task is displayed close to a trigger edge triggered by the edge sliding instruction.

In embodiments of the present application, a terminal with a foldable screen can display at least one latest task close to a trigger edge triggered by the edge sliding instruction according to a latest task display instruction.

Figure 10:
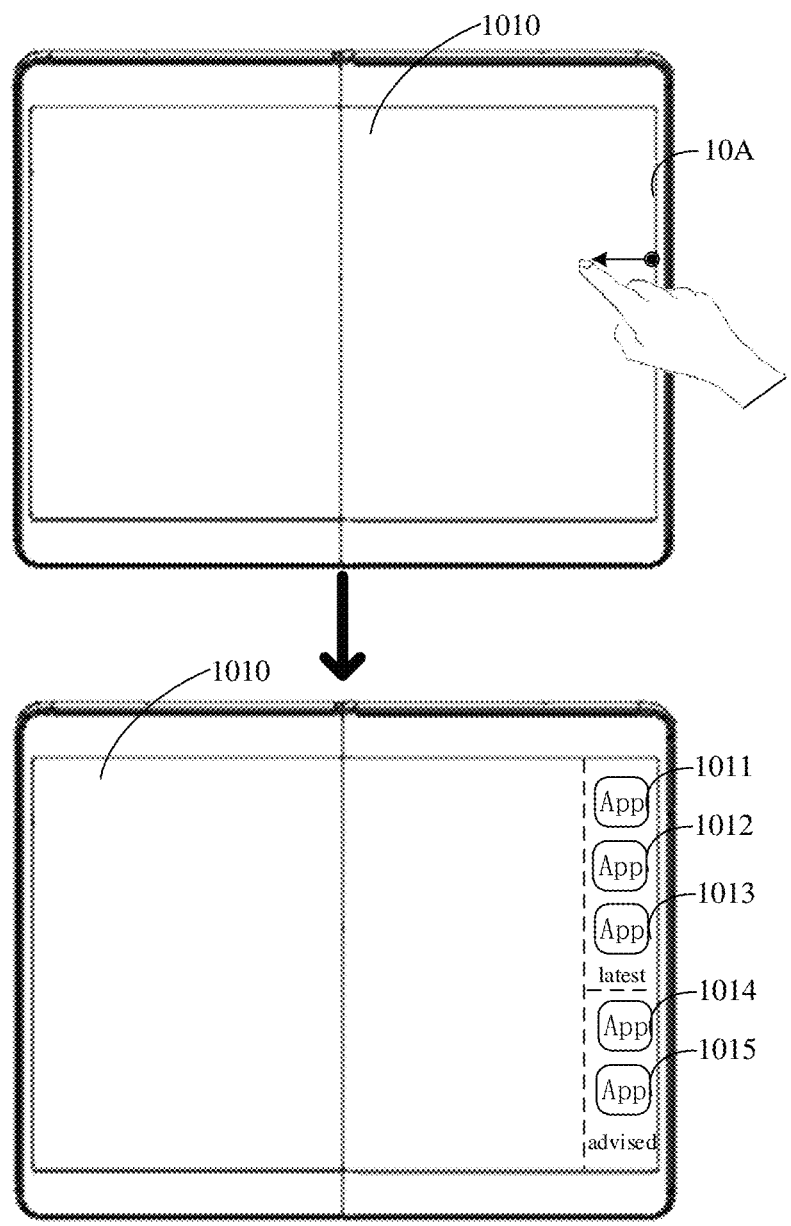
FIG. 10 is a schematic view of showing the latest task based on a terminal with a foldable screen being in an unfolded state provided by the embodiment shown in FIG. 9.

Referring to FIG. 10, which is a schematic view of showing the latest task based on a terminal with a foldable screen being in an unfolded state provided by the embodiment shown in FIG. 9. In a user interface 1010 of FIG. 10, a terminal with a foldable screen shows a current user interface. When the terminal with a foldable screen in an unfolded state receives an edge sliding instruction, the terminal with a foldable screen will acquire a trigger parameter of the edge sliding instruction; when the trigger parameter indicates that a trigger edge is parallel to a folding axis of the terminal with a foldable screen, and a sliding distance belongs to a first distance range, a latest task 1011, a latest task 1012, a latest task 1013, a latest task 1014, and a latest task 1015 are displayed.

Optionally, in a possible scene, the latest task can include tasks that are once used by users, and applications or services recommended to use by an operation system. In an optional display manner, a terminal with a foldable screen can display tasks that are once used by a user concentrically in one region, and display applications or services recommended to use by an operation system concentrically in another region. In FIG. 10, tasks that are once used by a user can be the latest task 1011, the latest task 1012, and the latest task 1013. Applications or services recommended to use by an operation system can be the latest task 1014 and the latest task 1015.

Operation 933, when the trigger edge is parallel to a folding axis of the terminal with a foldable screen, and the sliding distance belongs to a second distance range, it is determined that an application icon display instruction is a content display instruction corresponding to the edge sliding instruction.

In embodiments of the present application, a terminal with a foldable screen can determine an application icon display instruction when conditions are met.

In this embodiment, a left endpoint of the second distance range is not less than a right endpoint of the first distance range, and the application icon display instruction is configured to indicate the terminal with a foldable screen to display a start icon of at least application. That is, when the terminal with a foldable screen is in an unfolded state, sliding in a relatively short distance will call out at least one latest task, and a relatively long distance will call out a start icon of at least application.

Operation 934, a start icon of at least one application is displayed in a first sub-region.

In embodiments of the present application, the first sub-region is a region between a second sub-region and a trigger edge triggered by the edge sliding instruction, and the second sub-region is a region displaying at least one latest task.

In this embodiment, the first sub-region and the second sub-region belong to a first display region; alternatively, the first sub-region and the second sub-region belong to a second display region. It needs to be noted that when the terminal with a foldable screen is in a folded state, the screen is divided into the first display region and the second display region. That the first display region and the second display region are not located in the same plane can define the folded state in reverse.

In embodiments of the present application, when a sliding distance of an edge sliding instruction belongs to the second distance range, a terminal with a foldable screen can display the latest task and a start icon of at least one application respectively in different regions.

Operation 935, when receiving an instruction of clicking the start icon, an application corresponding to the start icon is displayed in a divided screen.

In a possible manner, a terminal with a foldable screen displays a user interface that is displayed by the terminal with a foldable screen before screen division in the first display region, and displays the application corresponding to the start icon in the second display region. Wherein, the first display region is a display region including a target edge, the target edge is an edge triggered by the edge sliding instruction.

It needs to be noted that the target edge can be a left edge of a terminal with a foldable screen, and can also be a right edge of the terminal with a foldable screen. The target edge can be arbitrarily set in a setting function of the terminal with a foldable screen by a user, and can also be preset in firmware of the terminal with a foldable screen, the present application does limit here.

Figure 11:
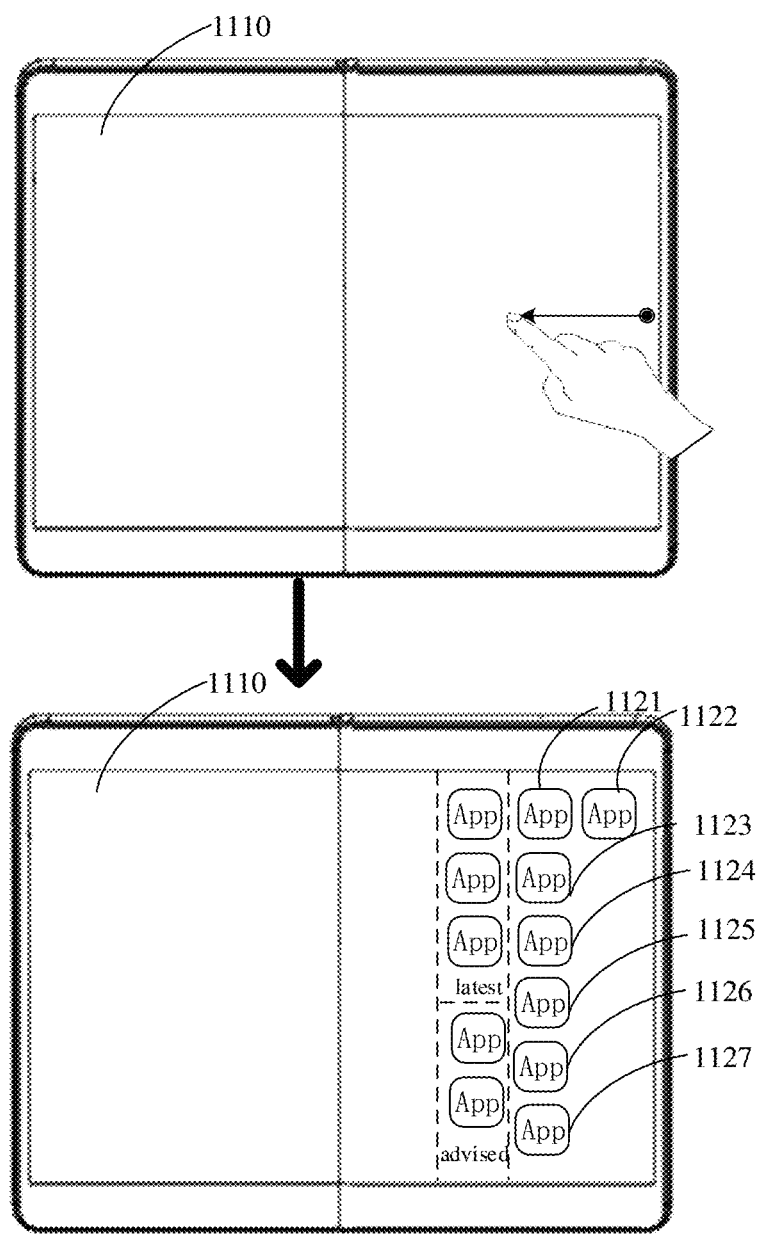
FIG. 11 is a schematic view of showing start icons of applications based on another terminal with a foldable screen being in an unfolded state provided by the embodiment shown in FIG. 9.

Referring to FIG. 11, which is a schematic view of showing start icons of applications based on another terminal with a foldable screen being in an unfolded state provided by the embodiment shown in FIG. 9. In FIG. 11, a user interface 1110 is a current user interface of a terminal with a foldable screen. When the terminal with a foldable screen in an unfolded state receives an edge sliding instruction, the terminal with a foldable screen will acquire a trigger parameter of the edge sliding instruction; when the trigger parameter indicates that a trigger edge is parallel to a folding axis of the terminal with a foldable screen, and a sliding distance belongs to a second distance range, an application start icon 1121, an application start icon 1122, an application start icon 1123, an application start icon 1124, an application start icon 1125, an application start icon 1126, and an application start icon 1127 are displayed.

Figure 12:
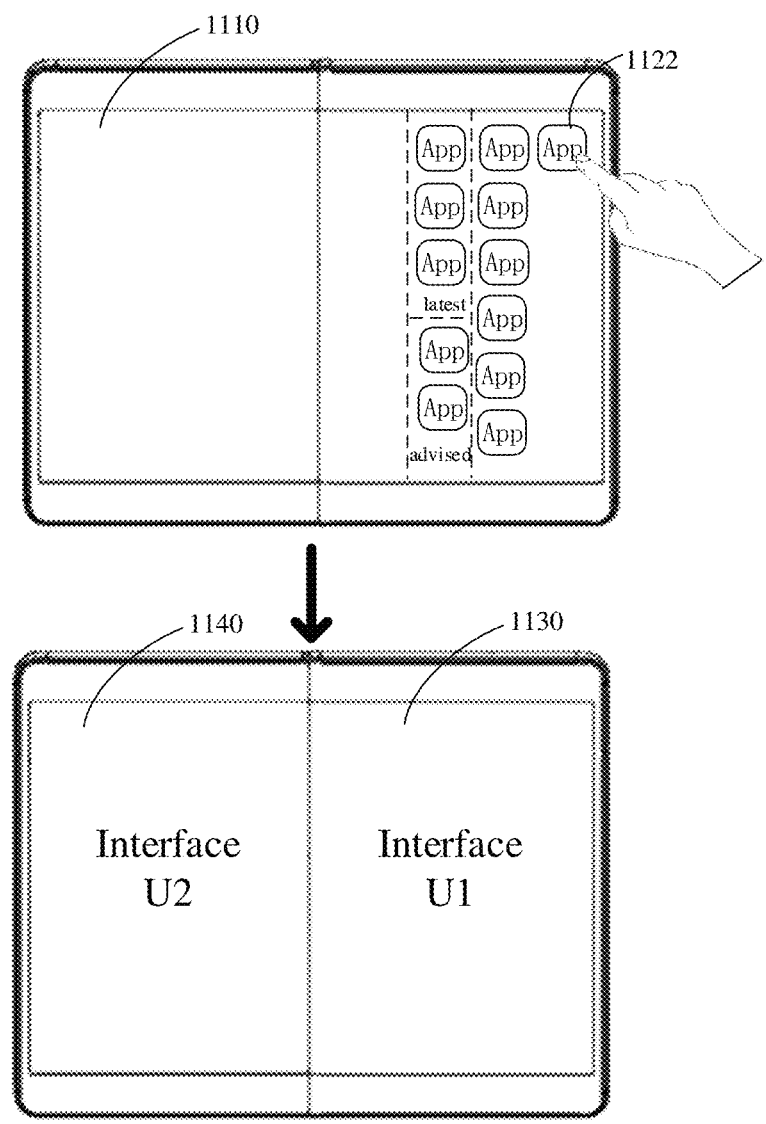
FIG. 12 is a schematic view of showing applications based on a terminal with a foldable screen being in an unfolded state provided by the embodiment shown in FIG. 11.

Referring to FIG. 12, which is a schematic view of showing applications based on a terminal with a foldable screen being in an unfolded state provided by the embodiment shown in FIG. 11. In FIG. 12, when the application start icon 1122 in the user interface 1110 is clicked, that is, when the terminal with a foldable screen receives a clicking operation, a clicking instruction is activated; a processor of the terminal with a foldable screen receives the clicking instruction, displays a user interface U1 that is displayed before screen division in the first display region 1130, and displays a user interface U2 of an application corresponding to the start icon 1122 in the second display region 1140. Thus, the effect of displaying applications in a divided screen in the unfolded state of the terminal with a foldable screen is formed, and application displaying efficiency of the terminal with a foldable screen is improved.

In conclusion, the method for displaying content provided by this embodiment can enable a terminal with a foldable screen to directly perform navigation control in an edge easily, and can quickly enter a screen division display state, thereby improving application displaying efficiency of the terminal with a foldable screen.

In a possible embodiment of the present application, a terminal can further determine displayed content by a continuously pressing time length detected on a specified edge. For example, taking FIG. 10 as an example, when an edge staying time length of a finger of a user on a trigger edge 10A exceeds 2 seconds, the terminal will display a trigger object in a screen.

In a possible manner, the trigger object can be text, and the text is used to indicate that further sliding inwards the screen will display content such as latest tasks, start icons, and so on.

In another possible manner, the trigger object can be an icon.

In another possible manner, the terminal can further prompt users that further sliding inwards the screen will display content such as latest tasks, start icons, and so on, in a manner of vibration.

In an application scene, when a trigger edge of a terminal with a foldable screen is parallel to a folding axis of the terminal with a foldable screen, an edge staying time length configured to indicate staying at the trigger edge is not less than a time length threshold, and a sliding distance belongs to a first distance range, it is determined that an instruction of displaying the latest task is a content display instruction corresponding to an edge sliding instruction.

The following are apparatus embodiments of the present application, which can be used to implement method embodiments of the present application. Regarding details that are not disclosed in the apparatus embodiments of the present application, please refer to the method embodiments of the present application.

Figure 13:
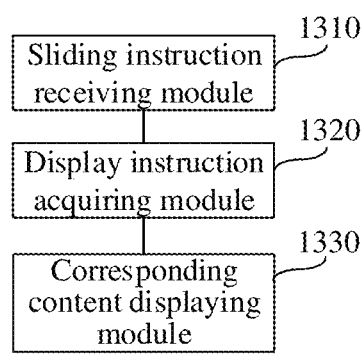
FIG. 13 is a structural block diagram of an apparatus for displaying content provided by an exemplary embodiment of the present application.

Referring to FIG. 13, which shows a structural block diagram of an apparatus for displaying content provided by an exemplary embodiment of the present application. The apparatus for displaying content can be implemented as a whole or a part of a terminal by software, hardware, or a combination of them. The apparatus includes: a sliding instruction receiving module 1310 configured for receiving an edge sliding instruction when the terminal with a foldable screen is in an unfolded state, wherein the edge sliding instruction is an instruction triggered by sliding from a trigger edge of the terminal with a foldable screen to inside of the screen, and the unfolded state is configured for indicating that the first display region and the second display region are located in the same plane; a display instruction acquiring module 1320 configured for acquiring a content display instruction corresponding to the edge sliding instruction; and a corresponding content displaying module 1330 configured for displaying content corresponding to the edge sliding instruction on the screen of the terminal with a foldable screen according to the content display instruction corresponding to the edge sliding instruction.

In an optional embodiment, the display instruction acquiring module 1320 is configured for: acquiring a trigger parameter of the edge sliding instruction, wherein the trigger parameter comprises at least one of a trigger edge, a sliding speed, an edge staying time length, and a sliding distance; and acquiring a corresponding content display instruction according to the trigger parameter.

In an optional embodiment, when the trigger parameter comprises the trigger edge and the sliding speed, the display instruction acquiring module 1320 is configured for: when the trigger edge is parallel to a folding axis of the terminal with a foldable screen, and the sliding speed is not less than a speed threshold, determining that an instruction of returning to a previous level is a content display instruction corresponding to the edge sliding instruction; wherein the instruction of returning to a previous level is configured for instructing the terminal with a foldable screen to display content of a previous level.

In an optional embodiment, when the trigger parameter comprises the trigger edge and the sliding distance, the display instruction acquiring module 1320 is configured for: when the trigger edge is parallel to a folding axis of the terminal with a foldable screen, and the sliding distance belongs to a first distance range, determining that an instruction of displaying the latest task is a content display instruction corresponding to the edge sliding instruction; wherein the instruction of displaying the latest task is configured for instructing the terminal with a foldable screen to display at least one latest task.

In an optional embodiment, the corresponding content displaying module 1330 is configured for displaying at least one latest task close to the trigger edge triggered by the edge sliding instruction according to the instruction of displaying the latest task.

In an optional embodiment, the display instruction acquiring module 1320 is configured for: when the trigger edge is parallel to a folding axis of the terminal with a foldable screen, and the sliding distance belongs to a second distance range, determining that an instruction of displaying an application icon is a content display instruction corresponding to the edge sliding instruction; wherein a left endpoint of the second distance range is not less than a right endpoint of the first distance range, and the instruction of displaying an application icon is configured for instructing the terminal with a foldable screen to display a start icon of at least one application.

In an optional embodiment, when an instruction of displaying an application icon is a content display instruction corresponding to the edge sliding instruction, the corresponding content displaying module 1330 is configured for: displaying a start icon of at least one application in a first sub-region, wherein the first sub-region is a region between a second sub-region and the trigger edge triggered by the edge sliding instruction, and the second sub-region is a region displaying the at least one latest task; wherein the first sub-region and the second sub-region belong to the first display region; or the first sub-region and the second sub-region belong to the second display region.

In an optional embodiment, the apparatus further includes an executing module, wherein the executing module is configured for: when receiving an instruction of clicking the start icon, displaying a user interface that is displayed by the terminal with a foldable screen before screen division on the first display region, and displaying an application corresponding to the start icon on the second display region; wherein the first display region is a display region comprising a target edge, and the target edge is an edge triggered by the edge sliding instruction.

In an optional embodiment, the trigger parameter further comprises the edge staying time length, and the display instruction acquiring module 1320 is configured for: when the trigger edge is parallel to a folding axis of the terminal with a foldable screen, the edge staying time length configured for indicating keeping the trigger edge is not less than a time length threshold, and the sliding distance belongs to the first edge range, determining that an instruction of displaying the latest task is a content display instruction corresponding to the edge sliding instruction.

In an optional embodiment, the apparatus further includes an object displaying module, wherein the object displaying module is configured for: when the trigger edge is parallel to a folding axis of the terminal with a foldable screen, and the edge staying time length configured for indicating keeping the trigger edge is not less than a time length threshold, displaying a triggered object close to the trigger edge, wherein the triggered object is configured for indicating that the terminal with a foldable screen is in a task display state; wherein the terminal with a foldable screen in the task display state determines that an instruction of displaying the latest task is a content display instruction corresponding to the edge sliding instruction when the sliding distance belongs to a first distance range.

Embodiments of the present application further provides a computer-readable storage medium, the computer-readable storage medium stores at least one instruction, the at least one instruction is loaded and executed by a processor to implement the method for displaying contents according to the above-described embodiments.

It needs to be noted that when an apparatus for displaying content provided by the above embodiments executes a method for displaying content, only the division of the above functional modules is used as an example for illustration. In practical applications, the above functions can be assigned to different functional modules to be completed according to needs, that is, an internal structure of the apparatus is divided into different functional modules to complete all or some of the functions described above. In addition, the apparatus for displaying content provided by the above-described embodiments belongs to the same concept as the embodiments of the method for displaying content. Regarding the specific implementation process thereof, please refer to the method embodiments, and it will not be repeated here.

The sequence numbers of the above-described embodiments of the present application are merely used for description, and do not indicate goodness and badness of the embodiments.

Those of ordinary skill in the art can understand that all or some of the steps of the above-described embodiments can be completed by hardware, and can also be completed by a program instructing relevant hardware. The program can be stored in a computer-readable storage medium. The storage medium mentioned above can be a read-only memory, a magnetic disk, an optical disk, etc.

The above described are only optional embodiments of the present application and are not intended to limit the present application. Any modification, equivalent replacement, and improvement made within the spirit and principle of the present application should be included in a protection scope of the present application.

What is claimed is:

1. A method for displaying content applicable to a terminal with a foldable screen, wherein the screen of the terminal comprises a first display region and a second display region; the method comprising:
   receiving an edge sliding instruction when the terminal is in an unfolded state, wherein the edge sliding instruction is an instruction triggered by sliding from a trigger edge of the terminal to inside of the screen, and the unfolded state is configured for indicating that the first display region and the second display region are located in the same plane;
   acquiring a content display instruction corresponding to the edge sliding instruction; and
   displaying content corresponding to the edge sliding instruction on the screen of the terminal according to the content display instruction corresponding to the edge sliding instruction;
   wherein acquiring the content display instruction corresponding to the edge sliding instruction comprises:
   acquiring a trigger parameter of the edge sliding instruction, wherein the trigger parameter comprises a trigger edge and a sliding distance; and
   acquiring a corresponding content display instruction according to the trigger parameter, comprising:
      determining that an instruction of displaying the latest task is the content display instruction corresponding to the edge sliding instruction when the trigger edge is parallel to a folding axis of the terminal and the sliding distance belongs to a first distance range; wherein the instruction of displaying the latest task is configured for instructing the terminal to display at least one latest task; and
   determining that an instruction of displaying an application icon is the content display instruction corresponding to the edge sliding instruction when the trigger edge is parallel to the folding axis of the terminal and the sliding distance belongs to a second distance range; wherein a left endpoint of the second distance range is not less than a right endpoint of the first distance range, and the instruction of displaying the application icon is configured for instructing the terminal to display a start icon of at least one application.

2. The method according to claim 1, wherein the trigger parameter further comprises at least one of a sliding speed or an edge staying time length.

3. The method according to claim 2, wherein the trigger parameter further comprises the sliding speed, and acquiring the corresponding content display instruction according to the trigger parameter comprises:
determining that an instruction of returning to a previous level is the content display instruction corresponding to the edge sliding instruction when the trigger edge is parallel to a-the folding axis of the terminal and the sliding speed is not less than a speed threshold; wherein the instruction of returning to the previous level is configured for instructing the terminal to display content of the previous level.

4. The method according to claim 1, wherein displaying the content corresponding to the edge sliding instruction on the screen of the terminal according to the content display instruction corresponding to the edge sliding instruction comprises:
displaying at least one latest task close to the trigger edge triggered by the edge sliding instruction according to the instruction of displaying the latest task.

5. The method according to claim 1, wherein when the instruction of displaying the application icon is a content display instruction corresponding to the edge sliding instruction, displaying the content corresponding to the edge sliding instruction on the screen of the terminal comprises:
displaying the start icon of the at least one application in a first sub-region, wherein the first sub-region is a region between a second sub-region and the trigger edge triggered by the edge sliding instruction, and the second sub-region is a region displaying the at least one latest task;
wherein the first sub-region and the second sub-region belong to the first display region; or the first sub-region and the second sub-region belong to the second display region.

6. The method according to claim 5, further comprising:
in response to receiving an instruction of clicking the start icon, displaying a user interface that is displayed by the terminal before screen division on the first display region, and displaying an application corresponding to the start icon on the second display region;
wherein the first display region is a display region comprising a target edge, and the target edge is an edge triggered by the edge sliding instruction.

7. The method according to claim 5, further comprising:
displaying the start icon of the at least one application in the first sub-region and displaying the at least one latest task in the second sub-region at the same time.

8. The method according to claim 1, wherein the trigger parameter comprises the edge staying time length, and wherein determining that the instruction of displaying the latest task is the content display instruction corresponding to the edge sliding instruction when the trigger edge is parallel to a-the folding axis of the terminal and the sliding distance belongs to the first distance range comprises:
determining that the instruction of displaying the latest task is the content display instruction corresponding to the edge sliding instruction when the trigger edge is parallel to the folding axis of the terminal, the edge staying time length configured for indicating keeping the trigger edge is not less than a time length threshold, and the sliding distance belongs to a first edge range.

9. The method according to claim 8, further comprising:
displaying a triggered object close to the trigger edge when the trigger edge is parallel to the folding axis of the terminal and the edge staying time length configured for indicating keeping the trigger edge is not less than a-the time length threshold, wherein the triggered object is configured for indicating that the terminal is in a task display state;
wherein the terminal in the task display state determines that the instruction of displaying the latest task is the content display instruction corresponding to the edge sliding instruction when the sliding distance belongs to the first distance range.

10. The method according to claim 1, wherein the latest task includes at least one task once used by a user and at least one application or service recommended to use by an operation system; and a region of the screen configured to display the at least one task once used by the user is adjacent to a region of the screen configured to display the at least one application or service recommended to use by the operation system.

11. A terminal, wherein the terminal comprises a foldable screen, a processor and a memory, the screen comprises a first display region and a second display region, the memory stores at least one instruction, and the instruction is loaded and executed by the processor to implement a method for displaying content comprising:
receiving an edge sliding instruction when the terminal is in an unfolded state, wherein the edge sliding instruction is an instruction triggered by sliding from a trigger edge of the terminal to inside of the screen, and the unfolded state is configured for indicating that the first display region and the second display region are located in the same plane;
acquiring a content display instruction corresponding to the edge sliding instruction; and
displaying content corresponding to the edge sliding instruction on the screen of the terminal according to the content display instruction corresponding to the edge sliding instruction,
wherein acquiring the content display instruction corresponding to the edge sliding instruction comprises:
acquiring a trigger parameter of the edge sliding instruction, wherein the trigger parameter comprises a trigger edge and a sliding distance; and
acquiring a corresponding content display instruction according to the trigger parameter, comprising:
determining that an instruction of displaying the latest task is the content display instruction corresponding to the edge sliding instruction when the trigger edge is parallel to a folding axis of the terminal and the sliding distance belongs to a first distance range; wherein the instruction of displaying the latest task is configured for instructing the terminal to display at least one latest task; and
determining that an instruction of displaying an application icon is the content display instruction corresponding to the edge sliding instruction when the trigger edge is parallel to the folding axis of the terminal and the sliding distance belongs to a second distance range; wherein a left endpoint of the second distance range is not less than a right endpoint of the first distance range, and the instruction of displaying the application icon is configured for instructing the terminal to display a start icon of at least one application.

12. The terminal according to claim 11, wherein the trigger parameter further comprises at least one of a sliding speed or an edge staying time length.

13. The terminal according to claim 12, wherein the trigger parameter further comprises the sliding speed, and acquiring the corresponding content display instruction according to the trigger parameter comprises:
determining that an instruction of returning to a previous level is a content display instruction corresponding to the edge sliding instruction when the trigger edge is parallel to the folding axis of the terminal and the sliding speed is not less than a speed threshold; wherein the instruction of returning to the previous level is configured for instructing the terminal to display content of the previous level.

14. The terminal according to claim 11, wherein displaying the content corresponding to the edge sliding instruction on the screen of the terminal according to the content display instruction corresponding to the edge sliding instruction comprises:
displaying at least one latest task close to the trigger edge triggered by the edge sliding instruction according to the instruction of displaying the latest task.

15. The terminal according to claim 11, wherein when the instruction of displaying the application icon is the content display instruction corresponding to the edge sliding instruction, displaying the content corresponding to the edge sliding instruction on the screen of the terminal comprises:
displaying the start icon of the at least one application in a first sub-region, wherein the first sub-region is a region between a second sub-region and the trigger edge triggered by the edge sliding instruction, and the second sub-region is a region displaying the at least one latest task;
wherein the first sub-region and the second sub-region belong to the first display region;
or the first sub-region and the second sub-region belong to the second display region.

16. The terminal according to claim 15, wherein the method for displaying content further comprises:
in response to receiving an instruction of clicking the start icon, displaying a user interface that is displayed by the terminal before screen division on the first display region, and displaying an application corresponding to the start icon on the second display region;
wherein the first display region is a display region comprising a target edge, and the target edge is an edge triggered by the edge sliding instruction.

17. The terminal according to claim 15, wherein the method for displaying content further comprises:
displaying the start icon of the at least one application in the first sub-region and displaying the at least one latest task in the second sub-region at the same time.

18. The terminal according to claim 11, wherein the trigger parameter comprises an edge staying time length, and wherein determining that the instruction of displaying the latest task is the content display instruction corresponding to the edge sliding instruction when the trigger edge is parallel to the folding axis of the terminal and the sliding distance belongs to a-the first distance range comprises:

determining that the instruction of displaying the latest task is the content display instruction corresponding to the edge sliding instruction when the trigger edge is parallel to the folding axis of the terminal, the edge staying time length configured for indicating keeping the trigger edge is not less than a time length threshold, and the sliding distance belongs to a first edge range.

19. The terminal according to claim 11, wherein the latest task includes at least one task once used by a user and at least one application or service recommended to use by an operation system; and a region of the screen configured to display the at least one task once used by the user is adjacent to a region of the screen configured to display the at least one application or service recommended to use by the operation system.

20. A non-transitory computer-readable storage medium, wherein the non-transitory computer-readable storage medium stores at least one instruction, and the instruction is loaded and executed by a processor to implement a method for displaying content applicable to a terminal with a foldable screen; wherein the screen of the terminal comprises a first display region and a second display region, and the method comprises:
receiving an edge sliding instruction when the terminal is in an unfolded state, wherein the edge sliding instruction is an instruction triggered by sliding from a trigger edge of the terminal to inside of the screen, and the unfolded state is configured for indicating that the first display region and the second display region are located in the same plane;
acquiring a content display instruction corresponding to the edge sliding instruction; and
displaying content corresponding to the edge sliding instruction on the screen of the terminal according to the content display instruction corresponding to the edge sliding instruction;
wherein acquiring the content display instruction corresponding to the edge sliding instruction comprises:
acquiring a trigger parameter of the edge sliding instruction; wherein the trigger parameter comprises a trigger edge and a sliding distance; and
acquiring the corresponding content display instruction according to the trigger parameter, comprising:
determining that an instruction of displaying the latest task is the content display instruction corresponding to the edge sliding instruction when the trigger edge is parallel to a folding axis of the terminal and the sliding distance belongs to a first distance range; wherein the instruction of displaying the latest task is configured for instructing the terminal to display at least one latest task; and
determining that an instruction of displaying an application icon is the content display instruction corresponding to the edge sliding instruction when the trigger edge is parallel to the folding axis of the terminal and the sliding distance belongs to a second distance range; wherein a left endpoint of the second distance range is not less than a right endpoint of the first distance range, and the instruction of displaying an application icon is configured for instructing the terminal to display a start icon of at least one application.

\* \* \* \* \*